United States Patent [19]
Ohtake

[11] Patent Number: 4,832,277
[45] Date of Patent: May 23, 1989

[54] FISHING REEL

[75] Inventor: Hiroshi Ohtake, Ashikaga, Japan

[73] Assignee: Copal Electronics Co., Ltd., Tokyo, Japan

[21] Appl. No.: 71,262

[22] Filed: Jul. 8, 1987

[30] Foreign Application Priority Data

Jul. 15, 1986 [JP] Japan .................. 61-165943
Jul. 15, 1986 [JP] Japan .................. 61-165944
Mar. 11, 1987 [JP] Japan .................. 62-55984

[51] Int. Cl.$^4$ .......................................... A01K 89/017
[52] U.S. Cl. ................... 242/84.1 A; 43/21; 242/215; 242/218
[58] Field of Search ............ 242/84.1 R, 84.1 A, 242/84.4, 84.41, 84.42, 84.43, 211, 212, 213, 214, 215, 216, 217, 218, 219, 220, 221; 43/21

[56] References Cited

U.S. PATENT DOCUMENTS

| | | | |
|---|---|---|---|
| 728,717 | 5/1903 | Hunter | 242/213 |
| 1,145,038 | 7/1915 | Schramm | 242/213 |
| 1,580,986 | 4/1926 | Aberson | 242/84.1 A |
| 3,017,134 | 1/1962 | Duvall | 242/211 X |
| 3,220,667 | 11/1965 | Madsen | 242/84.1 A X |
| 3,409,245 | 11/1968 | Grace | 242/84.1 A |
| 3,796,395 | 3/1974 | Rankin | 242/212 |
| 4,327,880 | 5/1982 | Dörbandt . | |
| 4,522,354 | 6/1985 | Sato et al. . | |
| 4,598,878 | 7/1986 | Steffan | 242/84.1 A |

FOREIGN PATENT DOCUMENTS

| | | | |
|---|---|---|---|
| 71866 | 6/1916 | Austria | 242/217 |
| 47-19008 | 5/1972 | Japan . | |
| 21452 | 6/1972 | Japan . | |
| 50-26790 | 8/1975 | Japan . | |

*Primary Examiner*—Joseph J. Hail III
*Attorney, Agent, or Firm*—Wenderoth, Lind & Ponack

[57] ABSTRACT

A fishing reel of double-bearing type is provided with a spool shaft on which a spool having a cylinder body is rotatably mounted. The spool shaft has a spool gear mounted on the end thereof and meshable with a drive gear mounted on a handle shaft connected to a handle which is rotatably held by a support. A driving shaft accommodated in a driving shaft cylinder on which are fixedly mounted a spool inner gear and a spool holder, is shiftable into a passage connecting two cavities defined in the spool cylinder by a biasing force of the coil spring spanning the driving shaft and a spring holder accommodated in the driving shaft cylinder as soon as an engagement between projections arranged on an inside wall of the driving shaft cylinder and recesses defined in the driving shaft body gets released when the spool inner gear which is driven by a motor via a pinion rotates simultaneously the driving shaft cylinder, the coil spring holder and an inner gear holder in a predetermined direction with the result that a head portion of the driving shaft thus shiftable is thrown into engagement with projections arranged on the inner wall of the passage of the spool cylinder, whereby the spool cylinder may be driven by the motor.

5 Claims, 6 Drawing Sheets

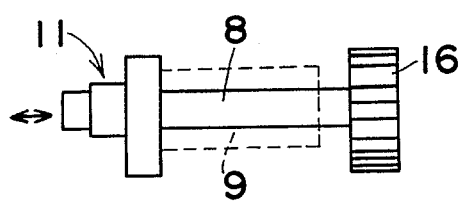
FIG.11
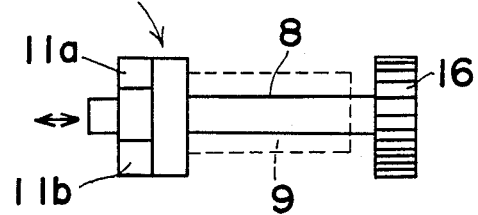
FIG.12
FIG.13
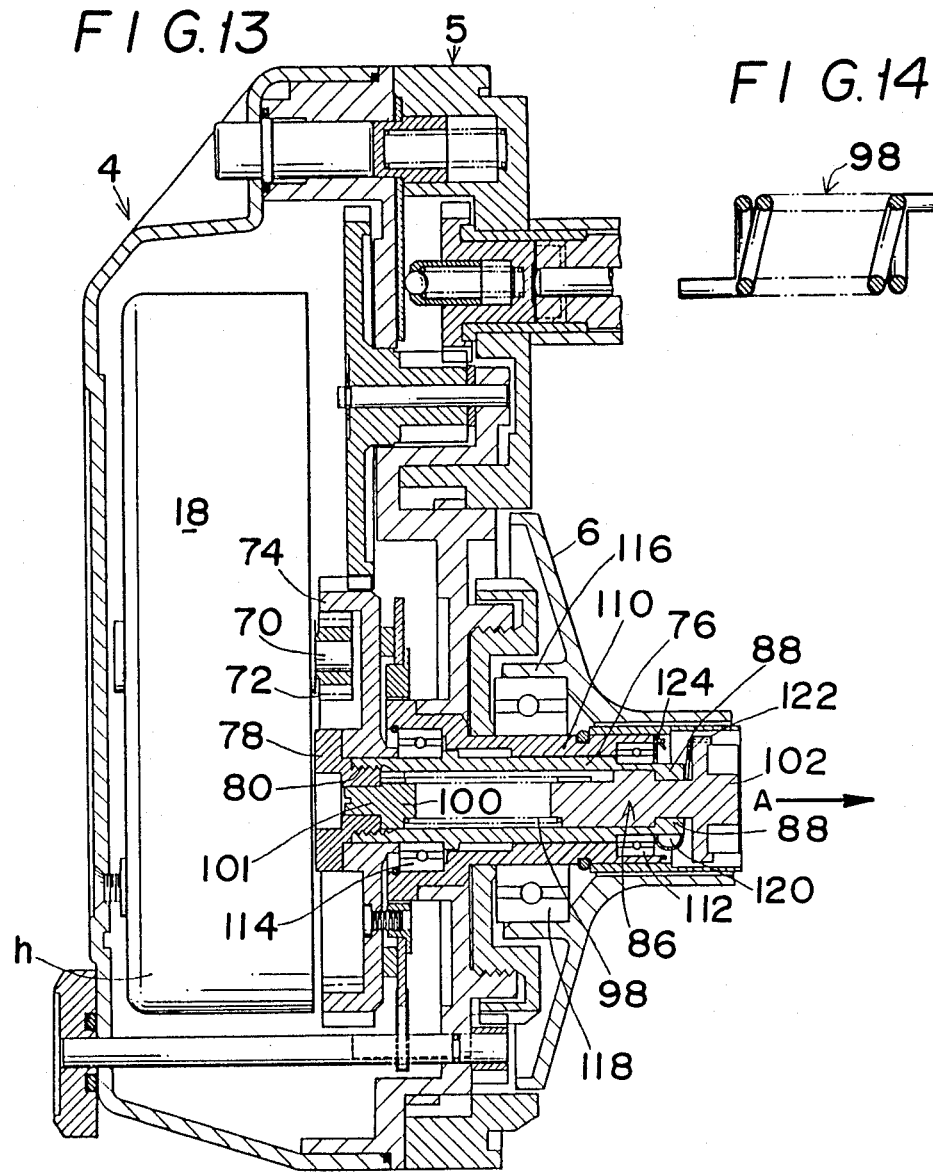
FIG.14
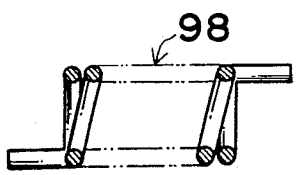

FISHING REEL

BACKGROUND OF THE INVENTION

This invention relates to a double-bearing fishing reel and more particularly to a driving means for a spool to be driven alternatively by a motor or by a handle.

One of the prior arts of this type is publicized in a Japanese Patent 1972-19008 dated May 31, 1972 in which a motor is separately arranged outside the housing of fishing reel and a driving shaft operable by a motor is connectable or disconnectable with a sliding shaft operable by a handle by means a spline whereby the fishing reel may be operated either by a motor or by a handle.

Another prior art is also publicized in a Japanese Patent 1975-26790 dated Aug. 9, 1975 wherein a spool shaft is driven either by a handle or by a motor arranged separately outside of a fishing reel housing. The handle and the motor are respectively engaged or disengaged with a spool shaft via the actuation of connecting means such as a handle shaft, a motor shaft and a gear means.

As the prior arts explained heretofore are equipped with an independent motor arranged outside of the fishing reel housing, the fishing equipment thus constructed is so bulky and heavy that it is very inconvenient for an operator to handle and to carry.

A further prior art is described in a Japanese Patent Publication 1972-21452 dated June 19, 1972 wherein a motor is accommodated in a fishing reel housing. An operation by a handle or by a motor is transmitted to a spool shaft via a gear means and an overrunning clutch respectively.

However, the structure of power transmitting means including the gear means and the overrunning clutch is so complicated that an accurate and speedy driving by a motor and a quick interchange of motor driving with handle operation may not be obtained.

BRIEF SUMMARY OF THE INVENTION

It is an object of this invention to provide a fishing reel of the compact type which is free from the above mentioned drawbacks encountered in a conventional type fishing reel and which permits a driving shaft to be driven by a motor accommodated in a fishing reel housing and a spool shaft operable by a handle to make quick and smooth engagement or disengagement alternatively with inner projections positioned on an inner wall of a passage communicating one cavity with another which are defined in a spool cylinder, whereby the spool cylinder may be alternately driven by the spool shaft or by the driving shaft, and whereby a quick interchange of manual and electrical operation of spool cylinder may be performed.

It is another object of this invention to provide a fishing reel which may overcome the drawbacks of the prior art. The fishing reel presented by this invention is simple and compact in structure and easy to operate. The fishing reel dispenses with such a complicated power transmitting means as adopted by the prior art and permits a driving shaft driven by a motor and a spool shaft operated by a handle to be shifted alternatively into or out of a passage of a spool cylinder to engage or disengage with inner projections positioned on an inner wall of the passage connecting cavities of the spool cylinder thereby an alternate rotation of a spool cylinder either by a motor or by a handle may be performed.

The above and further objects and novel features of the invention will be more fully understood from the following detailed description when the same is read in connection with the accompanying drawings.

BRIEF DESCRIPTION OF THE DRAWINGS

FIG. 11 is an enlarged side view of a spool shaft.

FIG. 12 is another side view of a spool shaft with projections shifted round.

FIG. 13 is an enlarged partly sectional illustration of FIG. 3.

FIG. 14 illustrates an enlarged sectional view of a coil spring.

DETAILED DESCRIPTION OF THE PREFERRED EMBODIMENT

An embodiment of the present invention will now be described with reference to the drawings.

Figure 1:
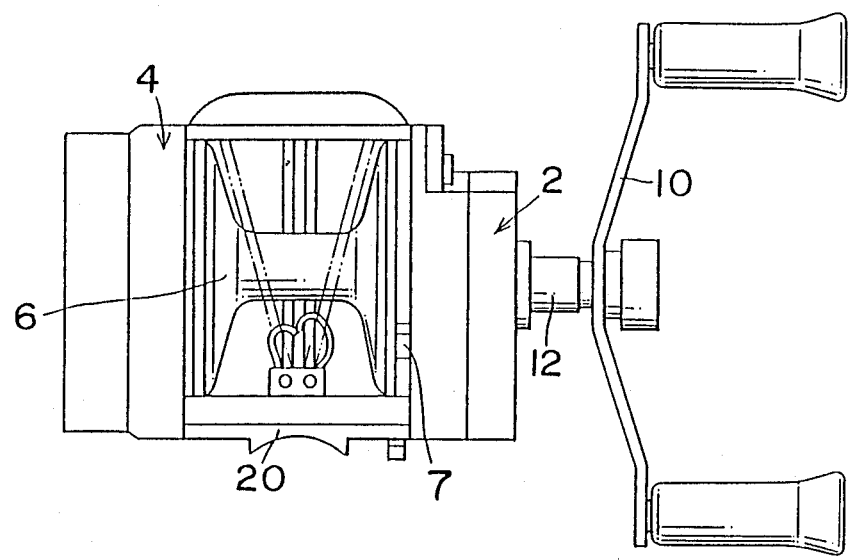
FIG. 1 illustrates a front elevation of a fishing reel according to this invention.
Figure 2:
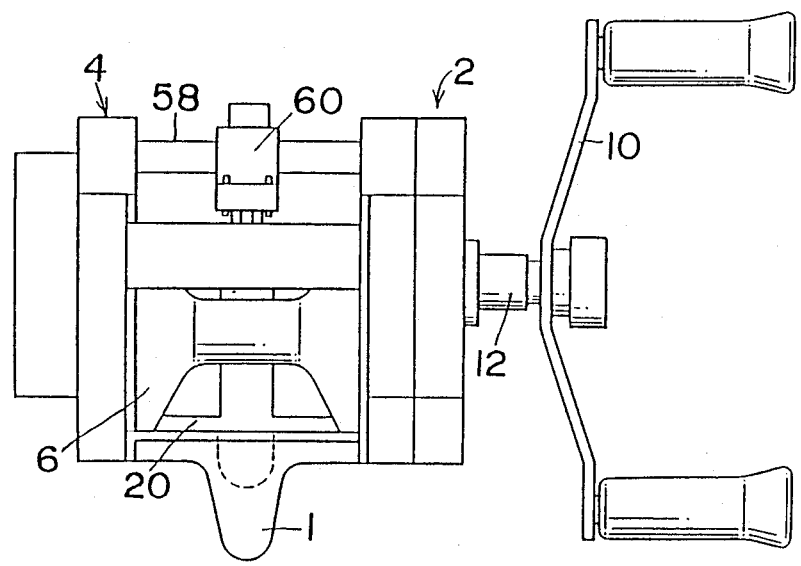
FIG. 2 is a top plan view of FIG. 1.
Figure 3:
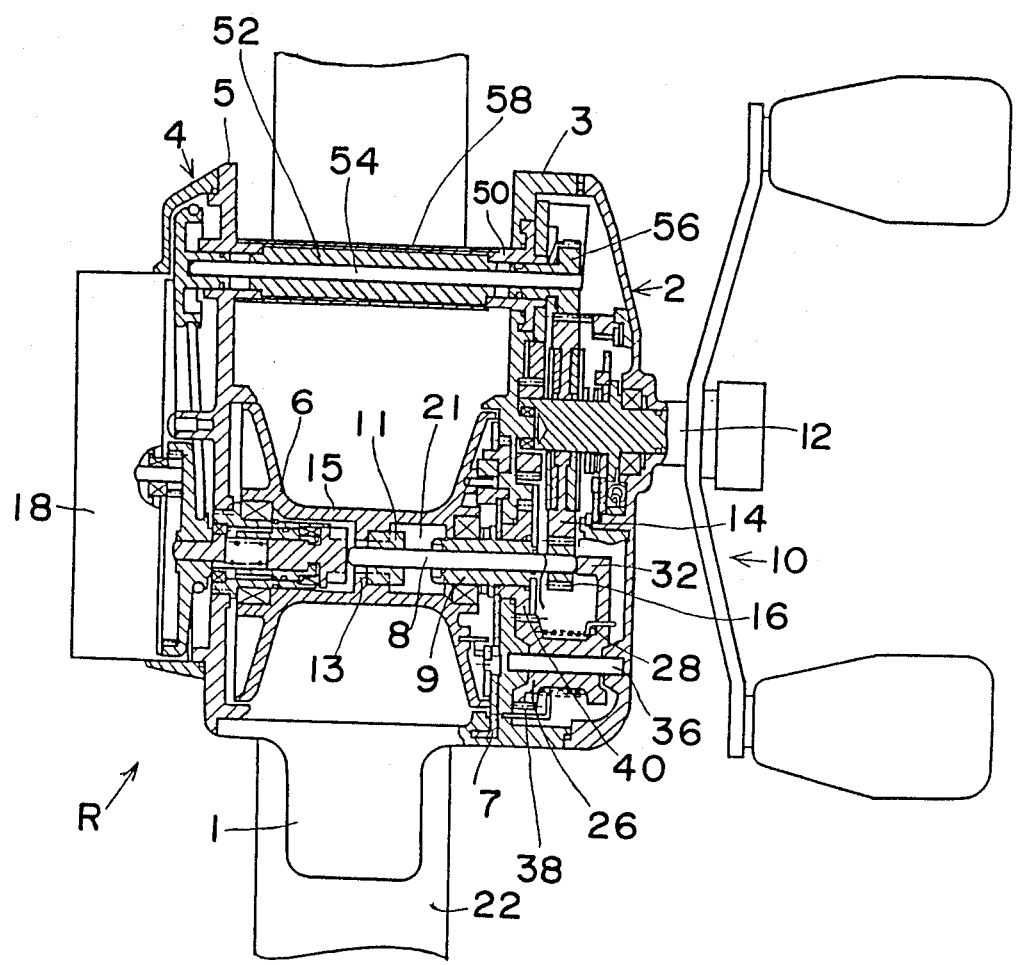
FIG. 3 is an enlarged vertical section view of a fishing reel according to this invention.

As shown in FIGS. 1 and 3, a spool shaft 8, on which a spool 6 having a cylinder 15 is rotatably mounted, is supported rotatably by a sleeve 9 arranged laterally on a frame 3. The spool shaft 8 is provided at its end with a spool gear 16 which is meshable with a drive gear 14 mounted on a handle shaft 12 connected to a handle 10 and at its other end is provided with an engaging member 11 having a pair of projections 11a and 11b which are engageable with a pair of projections 13 arranged on an inner wall of a passage 17 communicating a cavity 21 with another cavity 23 of the spool cylinder 15.

A driving motor 18 accommodated in a case or housing h is arranged in a side cover 4. A fishing reel generally designated by a letter R is fixed to a fishing rod 22 by means of a base member 20.

Figure 4:
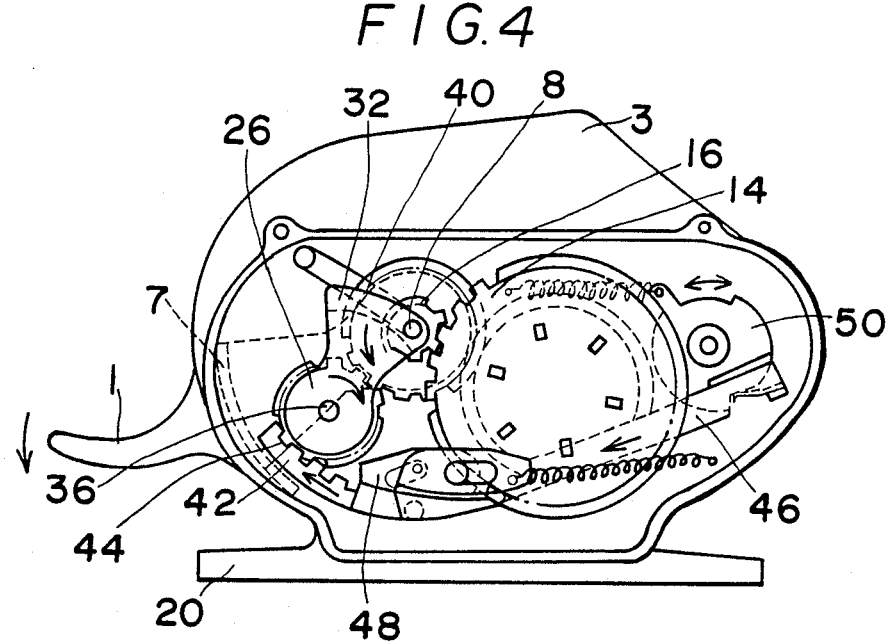
FIG. 4 illustrates an enlarged side view of FIG. 1 with a wall and a handle removed.
Figure 5:
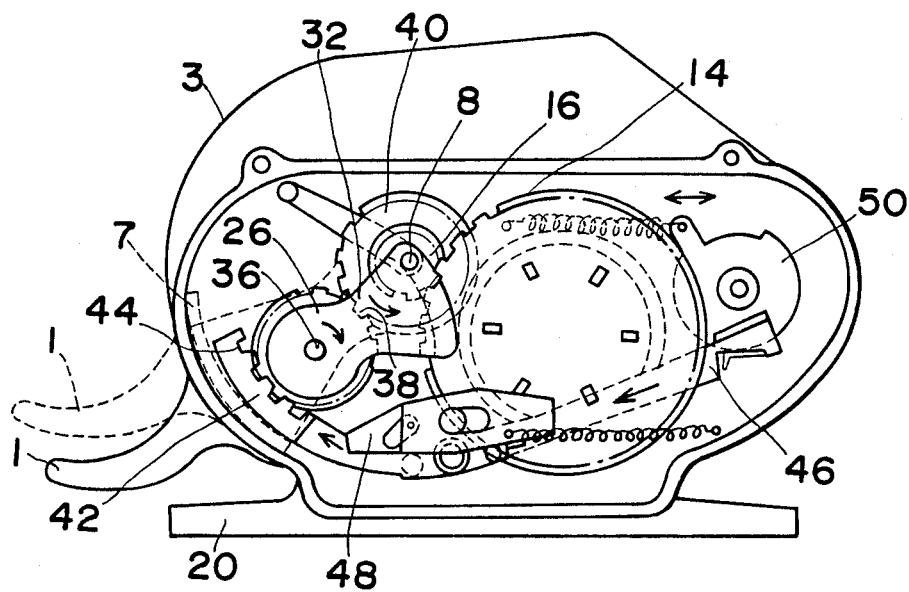
FIG. 5 is the same view as FIG. 4 with an operating lever pressed down.
Figure 6:
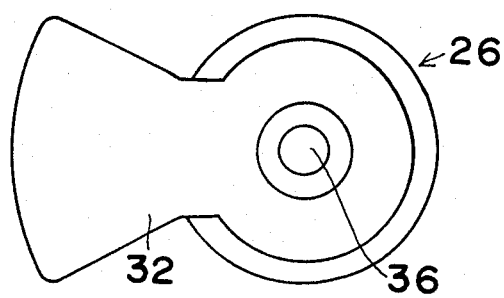
FIG. 6 is an enlarged top plan view of an operating gear.
Figure 8:
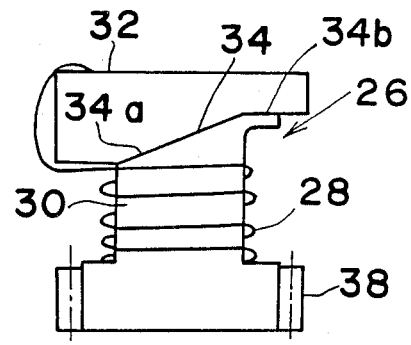
FIG. 8 is another side elevation of an operating gear.
Figure 7:
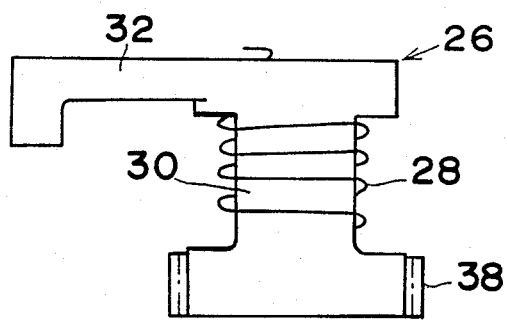
FIG. 7 illustrates a side elevation of FIG. 6.
Figure 10:
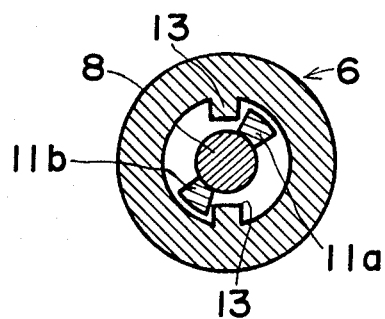
FIG. 10 shows an enlarged vertical section view of a spool and a spool shaft.
Figure 9:
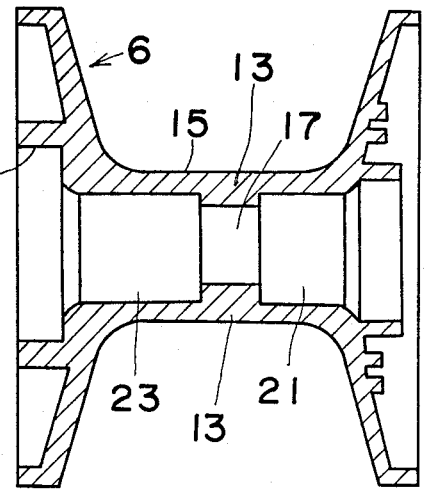
FIG. 9 is an enlarged longitudinal sectional view of a spool.

FIGS. 4 and 5 illustrate a schematic side view of the frame base 3 with a side cover 2 and the handle 10 removed. An operating gear 26, as shown in FIGS. 6, 7 and 8, has a cylindrical body 30 around which a torsion spring 28 is mounted, a fan-shaped arm 32 under surface of which is formed a slant taper portion 34 having a bottom surface 34a and an upper surface 34b and gear teeth 38 arranged at an end of the body 30.

The operating gear 26 is arranged rotatably on an operating gear shaft 36 spanning the side cover 2 and the frame 3. Gear teeth 38 of the operating gear 26 are in meshing engagement with a lever gear 40 mounted on the spool shaft 8 and with an inside gear 42 which will be explained in detail hereinafter. The slant taper portion 34 of the fan shaped arm 32 is slidably touchable on the end of the spool shaft 8 when the operating gear 26 is rotated thereby to shift the spool shaft 8 into or out of a passage 17 connecting two cavities 21 and 23 defined in the spool cylinder 15 with the result that the projections 11a and 11b of the engaging member 11 may be thrown into engagement or disengagement with the projection 13 arranged on the inner wall of the passage 17. The shifting of the spool shaft 8, as explained above, also brings forth a full or partial engagement between the drive gear 14 and the spool gear 16.

The inside gear 42 has a base provided with teeth 44 with which the operating gear 26 is meshed.

The inside gear 42 is connected to a level winder mechanism through connecting means such as a first link member 46, a second link member 48, a traverse cam bushing 50, a traverse cam 52, a traverse cam shaft 54, a traverse cam shaft gear 56 and a traverse cam shaft cylinder 58. These members cooperate to activate a level winder guide means 60 in such a way that the level winder guide means 60 may be shifted reciprocally in lateral direction on the traverse cam shaft cylinder 58. However, the level winder mechanism is not directly related to the structure of this invention. The explanation thereof may be eliminated.

A driving mechanism by a motor 18 according to this invention will now be explained referring specifically to FIG. 13.

Figure 15:
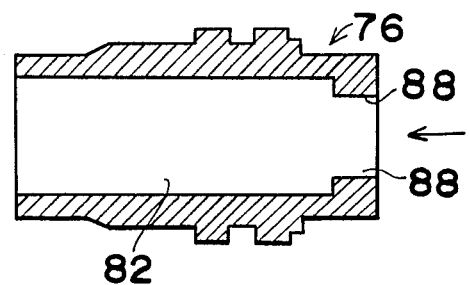
FIG. 15 is an enlarged sectional view of a driving shaft cylinder.
Figure 16:
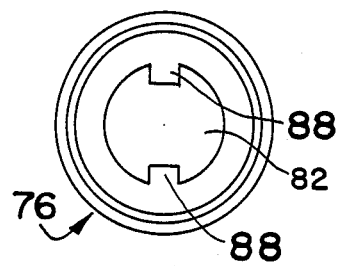
FIG. 16 is an end view of the driving shaft cylinder of FIG. 15 as seen in the direction of the arrow of FIG. 15.

A shaft 70 of the motor 18 accommodated in the housing h is provided with a pinion 72 meshable with a spool inner gear 74 which is fixedly mounted on a driving shaft cylinder 76. The spool inner gear 74 is also fixedly mounted on an inner gear holder 78 which is fitted to the driving shaft cylinder 76 via threaded portions 80 defined therebetween. With the rotation of the motor 18, the spool inner gear 74, the inner gear holder 78 and the driving shaft cylinder 76 may be rotated simultaneously. The driving shaft cylinder 76, as best illustrated in FIG. 15, has a chamber 82 in which a driving shaft 86 may be accommodated and on an end of the chamber 82 are formed a pair of projections 88 protruding in opposite directions.

Figure 17:
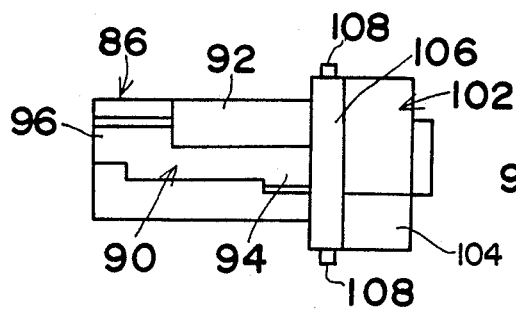
FIG. 17 illustrates an enlarged side view of a driving shaft.
Figure 18:
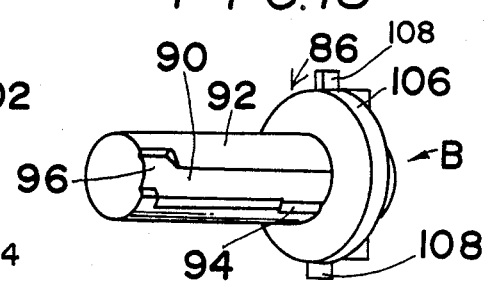
FIG. 18 is a perspective view of FIG. 17.
Figure 19:
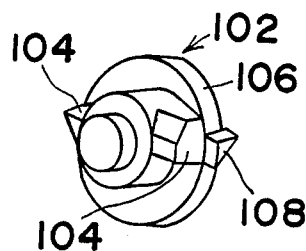
FIG. 19 is a perspective view seen from the direction of a letter B of FIG. 18.

The structure of the driving shaft 86 is best shown in FIGS. 17, 18 and 19, wherein the shaft 86 has a pair of main slits 90 defined longitudinally in both sides of the body 92 thereof.

The pair of main slits 90 is provided respectively at one end thereof with a recess 94 with which one of the projections 88 of the driving shaft 86 is engageable while at the other end thereof with a recess 96 which supports one end of a coil spring 98 arranged between the driving shaft 86 and a coil spring holder 100 accommodated in the driving shaft cylinder body 92 with its foot portion 101 fitted unmovably into the inner gear holder 78.

The driving shaft 86 is also provided with a head portion 102 at the other end thereof, on which a pair of projections 104 are symmetrically protruded. The driving shaft 86 is also provided with an annular flange 106 having a pair of protrusions 108 positioned on the surface thereof.

The driving shaft cylinder 76 is rotatably supported by a spool holder 110 via a first bearing 112 and a second bearing 114 respectively, while an annular projection 116 of the spool 6 is positioned on a third bearing 118 mounted rotatably on the spool holder 110.

A piece of U-shaped leaf spring 120 in section provided with a hooked end 122 is fitted around through the driving shaft 86 with the other end 124 fitted to the spool holder 110.

By means of the biasing force of the coil spring 98 spanning the driving shaft 86 and the spring holder 100, the pair of recesses 94 are arranged in such a way that the pair of projections 88 of the driving shaft cylinder 76 may respectively be brought into engagement with the recess 94.

This situation continues until the motor 18 starts driving as will hereinafter be explained.

Numeral 1 indicates an operating lever while 7 indicates a connecting means which rotates the lever gear 40 when the operating lever 1 is pressed down.

The operation of an embodiment of the fishing reel of this invention will now be described. FIG. 3 illustrates a situation wherein the engaging member 11 is engaged with the projection 13 of the spool cylinder 15 whereby the spool cylinder 15 is rotatable by the handle 10 through the handle shaft 12, the driving gear 14 and the spool gear 16.

When the operating lever 1 is pressed down, as shown in FIG. 5, the lever gear 40 is rotated counter-clockwise through the connecting means 7. Simultaneously the operating gear 26 meshing with the lever gear 40 is rotated clockwise as shown by an arrow against a biasing force of the torsion spring 28 mounted around the body 30. The inside gear 42 meshing with the operating gear 26 is in turn shifted hereby to actuate the level winder guide means 60 through connecting members such as the first link member 46, and others discussed above. When the operating gear 26 is thus rotated, the fan shaped arm 32 having a slant taper portion 34 is shifted slidably touching on the end of the spool shaft 8 starting from the upper surface 34b down to the bottom surface 34a (as seen in FIG. 8) whereby the spool shaft 8 is shifted away from the passage 17 with the result that the projections 11a and 11b of the engaging member 11 are thrown into disengagement with projections 13 disposed on the inner wall of the passage 17 of the spool cylinder 15.

The spool gear 16 mounted on the spool shaft 8 is also shifted therewith to hereby bring the driving gear 14 into a partial meshing with the spool gear 16. Naturally the spool cylinder 15 may be brought into free rotation on the spool shaft 8.

When the handle shaft 12 is rotated by the handle 10, the driving gear 14 rotatably arranged around the handle shaft 12 and meshing partially with the spool gear 16 is rotated to thereby restore the spool gear 16 back into a full meshing with the driving gear 14 as the end of the spool gear 16 touching on the bottom surface 34a of the taper cam 34 of the operating gear 26 slidably moves on the taper cam 34 toward the upper surface 34b thereof with the result that the spool shaft 8 is shifted into the passage 17 of the spool cylinder 15 whereby the engaging member 11 is again thrown into engagement with projections 13 positioned on the inner wall of the passage 17 communicating the cavities 23 and 21.

The operating lever 1 is also restored to its former up position through the operating gear 26 and the connecting means 7 as explained above.

Thus the operation of spool cylinder 15 by the handle 10 may be performed smoothly, whenever a handle operation is required.

Usually, before starting electric driving of a spool 6, the spool shaft 8 is brought into disengagement with the spool cylinder 15 by pressing the operating lever 1, as heretofore explained. In another words the spool 6 is freely rotatable. With the rotation of the shaft 70 in a predetermined direction driven by the motor 18, the spool inner gear 74 which is meshing with the pinion 72 of the shaft 70 is rotated accordingly. Simultaneously, the driving shaft cylinder 76 which is fitted to both the spool inner gear 74 and the inner gear holder 78 and supported by the bearing 112 is rotated with the coil spring holder 100 is the same direction which is in this embodiment an anti-clockwise direction as seen from the right in FIG. 13.

Figure 21:
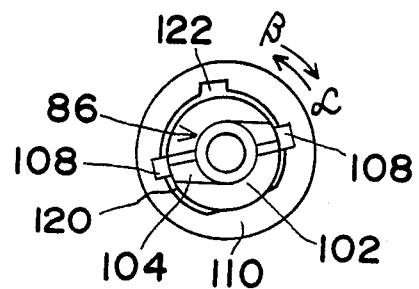
FIG. 21 is a front elevation of a driving shaft.
Figure 20:
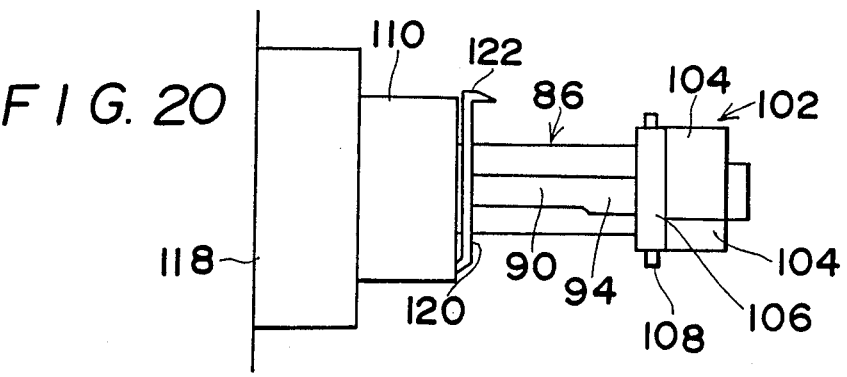
FIG. 20 illustrates an enlarged side elevation of a driving shaft shifted forward.

The anti-clockwise rotation of the coil spring holder 100 rotates the driving shaft 86 through the coil spring 98 to the direction shown by an arrow α as illustrated in FIG. 21, thereby the protrusion 108 arranged on the annular flange 106 is shifted anti-clockwise to collide against the hooked head 122 of the leaf spring 120. By repulsive force created by the collision, the protrusion 108 is rotated back to the direction shown by an arrow β in FIG. 21, thereby the engagement of the projections 88 of driving shaft cylinder 76 with the recesses 94 disposed in the body 92 of the driving shaft 86 is released with the result that by means of the biasing force of the coil spring 98, the driving shaft 86 is shifted in the direction as shown by an arrow A in FIG. 13, toward the passage 17 communicating the cavity 23 with the cavity 21 defined in the spool cylinder 15. The pair of protrusions 104 of the head portion 102 is thrown into engagement with the pair of projections 13 of the passage 17 respectively with the result that the driving shaft 86 is connected to the spool cylinder 15 for further driving thereof by the motor 18.

Thus by the rotation of spool cylinder 15 driven by the motor 18, a fishing line is wound thereon automatically.

As soon as the driving of the motor 18 is stopped by means of switches of the like, the handle shaft 12 is rotated by the handle 10 and the spool shaft 8 is shifted toward the passage 17 of the spool cylinder 15 whereby the engaging member 11 of the spool shaft 8 is thrown into engagement with projections 13 positioned on the inner wall of the passage 17 through the driving gear 14, the spool shaft 16, the taper cam 34, and the torsion spring 28 of the operating gear 26 as heretofore explained in detail (see FIGS. 3 and 13, especially).

With the engagement of the engaging member 11 with the projections 13 of the passage 17, the head portion 102 of the driving shaft 86 is pushed by the left end of spool shaft 8 (as viewed in FIG. 3) and shifted away from the passage 17 whereby the driving shaft 86 is disengaged from the spool 15. Thus the spool 6 is driven alternatively by the motor or by the handle.

What I claim is:

1. A fishing reel comprising:
   a casing means;
   a handle shaft rotatably attached to said casing means;
   a handle for rotating said handle shaft and attached thereto;
   a drive gear mounted on said handle shaft;
   a spool shaft rotatably and axially slidably mounted on said casing means, said spool shaft having a first and second end;
   a spool gear mounted on said spool shaft and meshable with said drive gear;
   a spool cylinder rotatably mounted on said spool shaft, said spool cylinder including a passage connecting two cavities defined therein, and said passage including projections on an inner wall thereof;
   a lever gear mounted on said spool shaft;
   an operating gear shaft attached to said casing means;
   an operating gear means rotatably mounted on said operating gear shaft, said operating gear means including an operating gear meshable with said lever gear, a cylindrical body, and an arm having an arm under surface, said arm under surface having a slant taper portion including a bottom and an upper surface, each said bottom and upper surface engageable with said first end of said spool shaft for axially sliding said spool shaft when said lever gear meshes with and rotates said operating gear, and said operating gear means including a torsion spring mounted on said cylindrical body, said torsion spring having a first and second end, and said first end being attached to said casing means and said second end being attached to said operating gear means for providing a biasing force to said operating gear means;
   an engaging member on said second end of said spool shaft, said engaging member having projecting means for engaging said projections on the inner wall of said passage of said spool cylinder when said projecting means of said engaging member is in said passage of said spool cylinder for rotating said spool cylinder, said projecting means disengaging said projections when said projecting means is axially slid out of said passage of said spool cylinder by said arm under surface engaging said first end of said spool shaft when said lever gear meshes with and rotates said operating gear in a first direction; and
   an operating lever movably attached to said casing, said operating lever engaging said lever gear, said operating lever rotating said lever gear in a first direction when said operating lever is moved for rotating said operating gear in its said first direction for disengaging said projections and said projecting means.

2. A fishing reel comprising:
   a casing means;
   a handle shaft rotatably attached to said casing means;
   a handle for rotating said handle shaft and attached thereto;
   a drive gear mounted on said handle shaft;
   a spool shaft rotatably and axially slidably mounted on said casing means, said spool shaft having a first and second end;
   a spool gear mounted on said spool shaft and meshable with said drive gear;
   a spool cylinder rotatably mounted on said spool shaft, said spool cylinder including a passage connecting two cavities defined therein, and said passage including projections on an inner wall thereof;
   a lever gear mounted on said spool shaft;
   an operating gear shaft attached to said casing means;

an operating gear means rotatably mounted on said operating gear shaft, said operating gear means including an operating gear meshable with said lever gear, a cylindrical body, and an arm having an arm under surface, said arm under surface having a slant taper portion including a bottom and an upper surface, each said bottom and upper surface engageable with said first end of said spool shaft for axially sliding said spool shaft when said lever gear meshes with and rotates said operating gear, and said operating gear means including a torsion spring mounted on said cylindrical body, said torsion spring having a first and second end, and said first end being attached to said casing means and said second end being attached to said operating gear means for providing a biasing force to said operating gear means;

an engaging member on said second end of said spool shaft, said engaging member having projecting means for engaging said projections on the inner wall of said passage of said spool cylinder when said projecting means of said engaging member is in said passage of said spool cylinder for rotating said spool cylinder, said projecting means disengaging said projections when said projecting means is axially slid out of said passage of said spool cylinder by said arm under surface engaging said first end of said spool shaft when said lever gear meshes with and rotates said operating gear in a first direction; and an operating lever movably attached to said casing, said operating lever engaging said lever gear, said operating lever rotating said lever gear in a first direction when said operating lever is moved for rotating said operating gear in its said first direction for disengaging said projections and said projecting means;

a motor attached to said casing means, said motor having a rotatable drivable motor shaft; and spool shaft engaging means attached to said casing means and drivably connected to said motor shaft, said spool shaft engaging means engaging said projections on said inner wall of said passage of said spool cylinder for rotating said spool cylinder when said projecting means of said engaging member on said second end of said spool shaft has been disengaged from said projections by moving said operating lever and when said motor has been turned on for rotating said motor shaft.

3. A fishing reel as in claim 2, wherein said spool shaft engaging means includes a driving shaft having a head portion provided with protrusions, said driving shaft is in a driving shaft cylinder on which is mounted a spool inner gear and a spool holder, said driving shaft is shiftable into said passage of said spool cylinder by means of the biasing force of a coil spring spanning said driving shaft and a spring holder which is also accommodated in said driving shaft cylinder, said driving shaft has at least one recess defined therein, said at least one recess is engageable with driving shaft projections arranged on an inside wall of said driving shaft cylinder, the engagement is released when said spool inner gear which is driven by the motor rotates said driving shaft cylinder in a predetermined direction simultaneously with said coil spring for shifting said head portion of said driving shaft into said passage of said spool cylinder for engaging said head portion of said driving shaft with said projections on said inner wall of said passage of said spool cylinder for rotating said spool cylinder by said motor.

4. A fishing reel as in claim 2, wherein a U-shaped leaf spring having a hooked end is fitted around through said driving shaft and the other end of said U-shaped leaf spring is fitted to said spool holder.

5. A fishing reel as in claim 4, wherein said driving shaft has an annular flange having a pair of protrusions positioned on the surface thereof, and said pair of protrusions are collidable with said hooked end of said U-shaped leaf spring responsive to rotation of said driving shaft.

* * * * *